United States Patent [19]
Thompson et al.

[11] 3,807,769
[45] Apr. 30, 1974

[54] QUICK HITCH ATTACHMENT

[75] Inventors: Howard G. Thompson; Marcus L. McIntyre, both of Livonia, Mich.

[73] Assignee: Massey-Ferguson Inc., Detroit, Mich.

[22] Filed: Sept. 25, 1972

[21] Appl. No.: 292,039

[52] U.S. Cl............ 280/479 R, 280/461 R, 172/272
[51] Int. Cl............................................ B62d 53/00
[58] Field of Search........ 280/461 A, 460 A, 479 R; 172/272

[56] References Cited
UNITED STATES PATENTS

| | | | |
|---|---|---|---|
| 3,172,686 | 3/1965 | Beard | 280/479 R |
| 3,195,651 | 7/1965 | Todd | 280/461 A X |
| 3,498,638 | 3/1970 | Magruder | 280/461 X |
| 3,544,133 | 12/1970 | Lemmon | 280/479 R |
| 3,531,140 | 9/1970 | Di Vita | 280/477 |

*Primary Examiner*—Leo Friaglia
*Attorney, Agent, or Firm*—George C. Bower

[57] ABSTRACT

A quick attach hitch for a tractor has a pair of draft pin receiving jaws which have lockable and releasable latch means. Independent draft pin operated trigger means and operator actuated means act through an overcenter toggle means to move the latch between lock and release positions.

7 Claims, 8 Drawing Figures

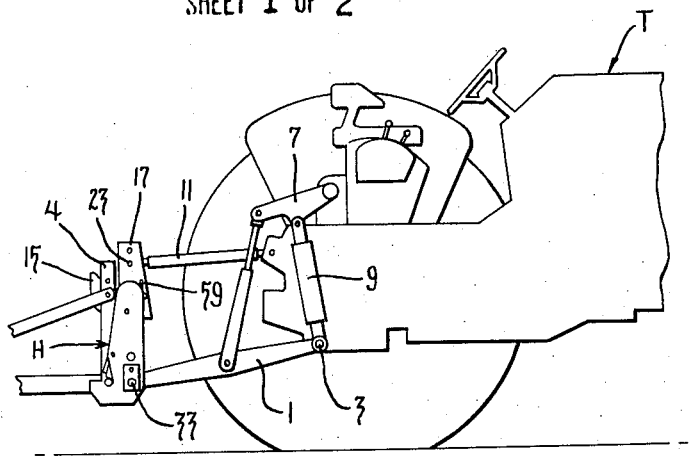
Fig. 1
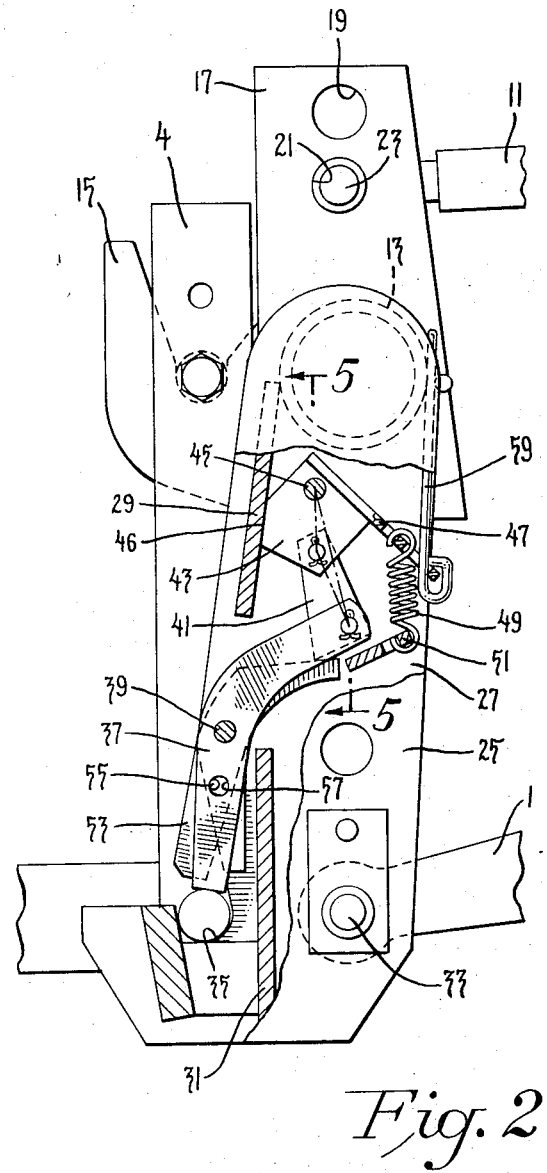
Fig. 2
Fig. 3

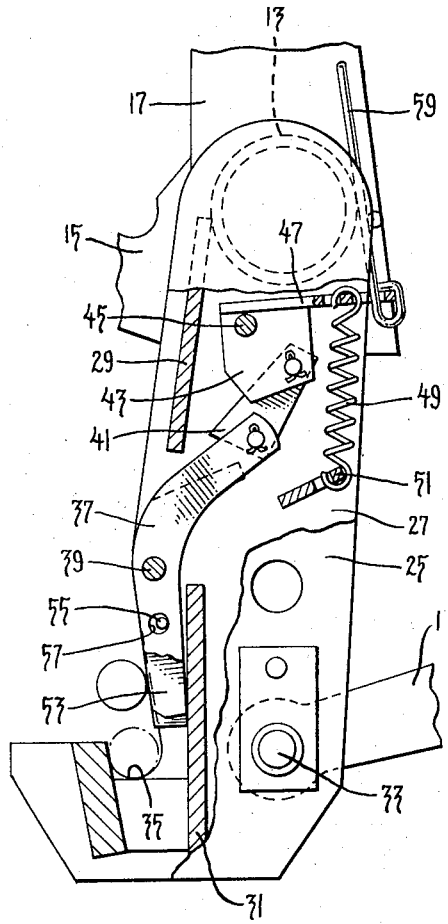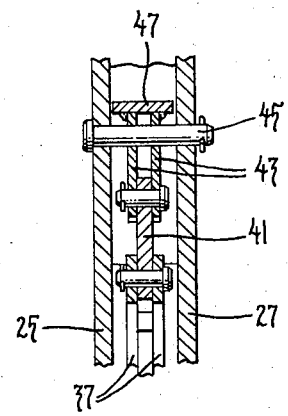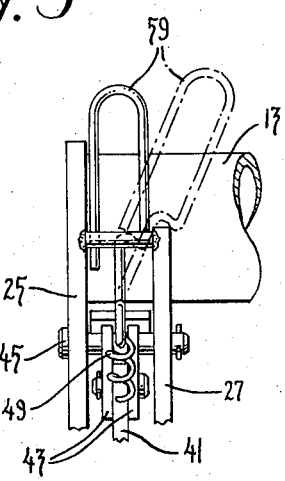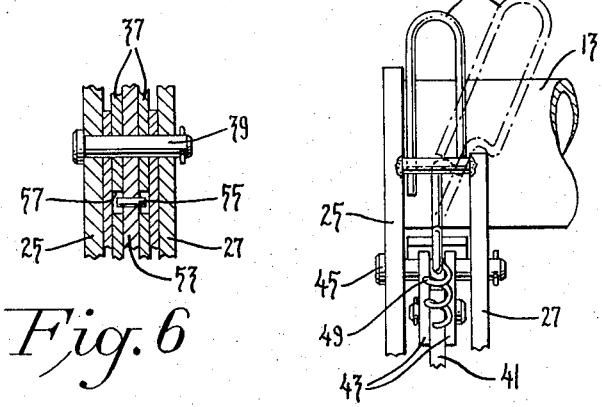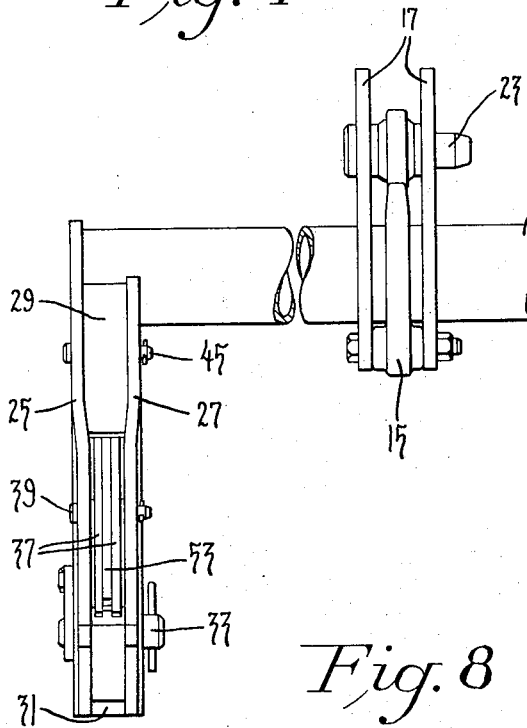

QUICK HITCH ATTACHMENT

This invention relates to a tractor hitch and more particularly to a quick release type tractor hitch that can be mounted on the draft links of a tractor. With the advent of very large agricultural implements it has become almost impossible for the tractor operator to manually and physically maneuver the implement into a position where it can be coupled to the normal three-point hitch of a tractor. In order to overcome this problem there have been devised "quick hitches" which are attachments that are mounted on the lower draft links and top link of the three-point hitch tractor and which have upper and lower hook mechanisms which will engage the draft pins on the implement as the hitch mechanism is raised by the hydraulic mechanism of the tractor.

Some of these hitches provide for latching and releasing mechanisms for locking the implement draft pins in at least some of the hook portions and by unlocking the pins, for permitting the implement to be detached from the tractor. The optimum hitch will provide for permitting the draft pins to open the latch mechanism upon entry of the pins into the hook mechanism with subsequent locking or latching of the pins. The optimum hitch also provides for operator means for moving the latching mechanism to a release position to enable the implement to be detached from the tractor.

It is an object of the present invention to provide an improved quick hitch attachment that provides optimum features.

It is a further object of the invention to provide a quick hitch wherein the operator can visually determine if the hooking mechanism is hooked, wherein room is provided in the hitch mechanism for attaching the tractor lower links in at least two different locations, wherein the substantial portion of the mechanism is out of the way of dirt and damage, and wherein the mechanism may be easily modified to permit only manual operation.

These and other objectives and advantages will be readily apparent from the following specification and accompanying drawings in which:

FIG. 1 is a side view showing an agricultural tractor having the subject hitch thereon;

FIG. 2 is an enlarged partially broken away view of the hitch mechanism with the latch holding draft pins in the hook;

FIG. 3 is a partially broken away view similar to FIG. 2 showing the operation of the mechanism during attachment to the implement;

FIG. 4 is still another partially broken away view showing the mechanism in manual release position;

FIG. 5 is a view taken on the section lines 5—5 of FIG. 2;

FIG. 6 is a sectional view taken on the lines 6—6 of FIG. 3;

FIG. 7 is a view from the front of the hitch showing the two positions of the operator handle; and FIG. 8 is a view from the rear of the hitch.

Referring now to FIG. 1, the tractor generally designated T includes a pair of lower links 1, only one of which is shown, that are pivoted at 3 on the tractor and are raised and lowered by lift lever 7 operated by hydraulic cylinder 9. A top link 11 forms the third element of the conventional three-point hitch. The two lower draft links 1 and the top link 11 are connected to the hitch mechanism which includes a cross member 13 to which is secured a top link hook 15 and a pair of top link receiving plates 17 which have holes 19 and 21 for receiving a pin 23 carried on the rear of the tractor top link.

At the outer ends of the cross member 13 are assemblies which include outer plates 25 and inner plates 27. An upper spacer 29 and lower spacer 31 separate the inner and outer plates 27 and 25. Draft pins 33 connect the lower links 1 to the lower forward portions of the inner and outer plates. The inner and outer plates are formed in the shape of a hook in their lower portions and include pin receiving portion 35.

The latching mechanism will now be described. Since the latch mechanism on each side of the hitch is identical, only one mechanism will be referred to. A latch member 37 is mounted between the inner and outer plates by means of a pivot pin 39 and is movable to the position shown in FIG. 2 wherein it prevents entry and exit of a draft pin receiving portion 35. The latch 37 is pivotally connected at its upper end to an overcenter toggle device which includes a lower link 41 pivotally connected to an upper link or lever 43 which is pivoted on a stationary pin 45. The upper lever has a portion 46 that engages the upper spacer member 29 which acts as a stop to limit clockwise rotation of the lever 43 about a pin 45. The upper link 43 has a flange portion 47 that receives the upper end of a spring 49, the lower end of which is attached to an anchor member 51 secured between the inner and outer plates 27 and 25. The spring 49 acts to bias the upper link 43 in a clockwise direction against the spacer 29 as shown in FIG. 2. On the other hand, the spring 49 permits the link 43 to be rotated counter-clockwise about the pin 45 into the position shown in FIG. 3 or even further into the position shown in FIG. 4.

A trigger mechanism 53 is also pivoted on the pin 39 and the lower portion thereof also acts to block entrance and exit of the draft pins into the hooks. The upper end of the trigger 53 engages the lower end of the lower link 41 of the overcenter mechanism and as seen in FIG. 2 is urged clockwise about the picot pin 39 into the position shown in FIG. 2. Counter-clockwise movement of the trigger 53 about pin 39 will cause the lower link 41 of the overcenter mechanism to move into the position shown in FIG. 3 whereupon the latch 37 can be further rotated counter-clockwise about pin 39 against the force of the spring 49. A pin 55 is carried by the trigger 53 and extends through a hole 57 in the latch member 37 for the purpose to be described below.

The overcenter mechanism can be moved from its locking position to FIG. 2 to a fully released position of FIG. 4 by means of an operator manually operated handle 59 that is connected to the lower end of the flange 47 of the upper link of the overcenter mechanism. The handle 59 has a hook portion thereon which can be placed over the upper end of the inner plates 27 to hold the same in an upper position. If the handle 59 is raised, it causes the flange 47 to rotate counter-clockwise against the force of spring 49 and causes the latch 37 to be moved into the position shown in FIG. 4 and by means of the pin 55 carry the trigger 53 to a released position shown in FIG. 4.

OPERATION

The operation of the subject hitch will now be described. To couple and implement to the tractor the operator need not manually set the latch mechanism in an unlocked position shown in FIG. 4. He may back the tractor and the hitch H into position just in front of the mast 4 of the implement and by means of the hydraulic control raise the hitch until the upper hook 15 engages the top hitch pin on the implement. At this time, the lower draft pins carried by the implement will engage the trigger 53 as seen in FIG. 3 to move the same rearwardly and cause the overcenter mechanism to be tripped from the position shown in FIG. 2 to the released position of FIG. 3. This action is against the force of spring 49. After the draft pins have engaged in the pin receiving portions 35, the trigger and latch are raised by the spring 49 to the locking position shown in FIG. 2 to hold the pins in the hooks.

As the above coupling action takes place the handle 59 will raise and the tractor operator can observe from the position of the handle 59 when the mechanism has become fully latched which will be shown by the return of the handle 59 to the lower position shown in FIG. 2. Thus the operator can visually determine whether or not the pins are fully engaged and thus prevent the operation of the tractor with only a partial engagement of the hitch. Operation under such conditions could cause damage to the implement or hitch mechanism.

When the operator wishes to detach the implement from the hitch he merely raises both of the handles 59 and hooks the same over the plates 27 to the position shown in FIG. 7. The latch mechanism is then in the position shown in FIG. 4 wherein the draft pins are free to leave the hook as the hitch mechanism is lowered by the tractor operator. The handles 59 can be raised by ropes if necessary to enable the operator to operate the same from the seat.

In order to accommodate different implements it is desirable that the lower links of the tractor be attached at several vertically spaced points on the quick hitch. The structure of the present hitch, which provides that the overcenter mechanism is located substantially vertically above the attaching point, permits connection of the lower links at two points without interference with the overcenter mechanism. Because the trigger 53 is free to rotate about the pin 39 and is not connected to the overcenter mechanism and is free to move within limits it will not tend to bind due to dirt entering between the trigger and latch mechanism. Also because the movement of the operator handle is entirely vertical, there is no need to provide forward clearance for operation of the same and furthermore, there is less possibility of damage to the mechanism as in the case where the manual unlatching mechanism is moved forwardly of the hitch device.

With the construction shown, the trigger 53 may be removed to provide a completely manually controlled hitching and unhitching operation. This may be desirable in the case where the operator wishes to positively prevent any release of the mechanism except by this action. This is possible because the trigger 53 forms no part of the overcenter mechanism or part of the latch mechanism.

Modifications of the hitch will be readily apparent to those skilled in the art and such modifications are deemed to be within the scope of the invention which is limited only by the following claims.

We claim:

1. A quick hitch device for coupling the draft links of a tractor with an implement having spaced draft pins adapted to be connected to the hitch, comprising in combination, a frame member having a pair of spaced hook members adapted to receive the implement spaced draft pins, a pair of latch means pivoted on said frame and movable between a first locking position where a draft pin contained in each hook member is prevented by the lower edge of said latch means from leaving the hook and a second release position wherein the pin may be released from the hook, overcenter toggle means carried by the frame and connected to each of said latch means, said overcenter means having a first normal position holding said latch in its locking position, a trigger pivoted on said frame and positioned to be engaged by the draft pins only above said latch means lower edge, said trigger operable to engage said overcenter means to move it to a second position permitting said latch to be moved to its second release position permitting entry of draft pins into the hook, and a control member connected to the overcenter means and manually operable to move the same to release position to enable release of the draft pin from the hook.

2. The hitch device of claim 1 wherein said overcenter toggle means includes spring means urging the same to its first normal position and wherein said trigger and said control member act to move the overcenter means against the spring means.

3. The hitch device of claim 2 wherein lock means are provided to hold the control member in position to hold the overcenter toggle means in release position.

4. The hitch device of claim 1 wherein said control member extends above said frame and is positively connected to said overcenter means and serves as an indicator signal to enable the tractor operator to know if the latch is in release or lock position.

5. The hitch device of claim 1 wherein said overcenter toggle means is vertically spaced above the latch and hook to provide clearance for connecting the tractor draft links at several vertically spaced locations on said frame.

6. The hitch device of claim 1 wherein a lost motion connection between the latch means and trigger means causes the latch means to move the trigger member out of the path of the draft pins when the overcenter toggle means and connected latch means are moved to their release positions by the control member.

7. A quick hitch device for coupling the draft links of a tractor with an implement having spaced draft pins adapted to be connected to the hitch, comprising in combination, a frame member having a pair of spaced hook members adapted to receive the implement spaced draft pins, a pair of latch means pivoted on said frame and movable between a first locking position where a draft pin contained in each hook member is prevented by the lower edge of said latch means from leaving the hook and a second release position wherein the pin may be released from the hook, overcenter toggle means carried by the frame and connected to each of said latch means, said overcenter means including biasing means urging the overcenter means to a first normal position holding said latch in its locking position, a trigger pivoted on said frame independently from said latch and positioned to be engaged by the draft pins only above said latch means lower edge, said trigger operable when moved by said pins to engage said overcenter means to move it against the biasing means to a second position permitting said latch to be moved to its second release position allowing entry of draft pins into the hook, and a control member connected to the overcenter means and manually operable to move the same to release position to enable release of the draft pin from the hook.

* * * * *